(12) United States Patent
Labuszewski et al.

(10) Patent No.: US 8,768,820 B2
(45) Date of Patent: Jul. 1, 2014

(54) COLLATERALIZED LENDING USING A CENTRAL COUNTERPARTY

(75) Inventors: John W. Labuszewski, Westmont, IL (US); Richard Co, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 597 days.

(21) Appl. No.: 12/344,839

(22) Filed: Dec. 29, 2008

(65) Prior Publication Data

US 2010/0169205 A1 Jul. 1, 2010

(51) Int. Cl.
*G06Q 40/00* (2012.01)
*G06Q 40/04* (2012.01)
*G06Q 40/06* (2012.01)
*G06Q 40/02* (2012.01)

(52) U.S. Cl.
USPC ............... 705/37; 705/36 R; 705/35; 705/40

(58) Field of Classification Search
USPC ................................. 705/35–37, 40
See application file for complete search history.

(56) References Cited

U.S. PATENT DOCUMENTS

| | | | |
|---|---|---|---|
| 5,819,230 A | 10/1998 | Christie et al. | |
| 7,567,928 B1 | 7/2009 | Oaten et al. | |
| 2001/0037284 A1* | 11/2001 | Finkelstein et al. | 705/37 |
| 2005/0137956 A1* | 6/2005 | Flory et al. | 705/37 |
| 2006/0059064 A1* | 3/2006 | Glinberg et al. | 705/35 |
| 2006/0155638 A1 | 7/2006 | De La Motte | |
| 2007/0250439 A1 | 10/2007 | Crocker | |
| 2007/0294159 A1* | 12/2007 | Cottle | 705/37 |
| 2008/0120213 A1 | 5/2008 | Morik | |
| 2009/0012893 A1* | 1/2009 | Davies | 705/37 |
| 2009/0063323 A1* | 3/2009 | Caffrey et al. | 705/37 |

OTHER PUBLICATIONS

Basic Financail Management; Martin et al; 5th Edition; prentice Hall, Inc. Englewood Cliffs, NJ 07632; 1991.*
International Search Report, PCT/US09/60865.
Co, Richard, "Box Spreads of Equity Index Options on Futures as a Financing Tool", Research and Product Development, Aug. 2008, 4 pages.
Repurchase agreement, Wikipedia, the free encyclopedia, dated Nov. 26, 2008, 5 pages.
The Lending Process of BNY Mellon Asset Servicing, website, www.mellon.com, 2 pages.

* cited by examiner

*Primary Examiner* — Harish T Dass
(74) *Attorney, Agent, or Firm* — Brinks Gilson & Lione

(57) ABSTRACT

A collateralized lending system and method using a central counterparty is disclosed. Lenders place orders to enter into long contracts with a central counterparty obligating them to lend an asset, or portion thereof. Borrowers place orders to enter into short contracts with the central counterparty obligating them to borrow an asset or a substantial equivalent thereof. The net effect acts like a lending transaction between the lender and the borrower. The central counterparty anonymously matches counter-orders from one or more borrowers and one or more lenders. Upon expiration of the loan, the central counterparty/clearing entity facilitates redemption of the loan. Thereby, the risk of loss due to borrower default is absorbed by the central counterparty encouraging lending activity by prospective lenders resulting in increased credit availability.

33 Claims, 7 Drawing Sheets

FIG. 3

| | |
|---|---|
| Notional Value | Based on $100,000 (USD) Notional Value (NV) at origination |
| Quote | Quoted as 100 less interest rate (100-R) in minimum increments of one-half (½) basis point or 0.00005%. E.g., rates (R) of 3.7650%, 3.7675%, 3.7700%, 3.7725% translate into quotes of 96.235, 96.2325, 96.23, 96.2275 |
| Tick Value | One-half (½) basis point represents $0.01388 for a 1-day tenor loan (= 0.00005 × $100,000/360); $002777 for 2-days; $0.041666 for 3-days; $0.097222 for 7-days; $0.194444 for 14 days; $0.388888 for 28 days |
| Delivery Dates | General Repo Futures (GRFs) quoted for future delivery on a t+n basis where n begins 7 days prior to the delivery. As such, there may always be open contracts with remaining terms until delivery of 0, 1, 2, 3, 4, 5, 6 and 7 days (interrupted by non-business days including weekends) |
| Loan Term | Loans delivered vs. GRFs for terms between Settlement Dates and End Dates of overnight (O/N), 2 days, 3 days, 7 days, 14 days and 28 days. Also, contracts with End Dates corresponding to Treasury refunding dates and 1st business days of March quarterly cycle (March, June, Sep, Dec) |
| Delivery | Longs deliver $100,000 to CMEG Clearing House on Settlement Date, passed to Short. Shorts deliver collateral valued at $100,000+interest. Transaction reversed on End Date. Clearing House defines acceptable collateral possibly subject to a "haircut" reflective of risk. |
| Interest Rate | Interest due on End Date calculated as function of days until maturity (d) and transacted interest rate (R): *Interest = $100,000 × (d/360) × R*  E.g., if R = 3.765% and d = 7 days then Interest = $73.21 = $100,000 × (7/360) × 0.03765. |
| Trading Hours | Privately transacted as block and novated to CMEG Clearing House; or, traded on CME Globex® electronic trading platform Sundays-Thursdays from 5:00 pm-4:00 pm (CT) the following day |

FIG. 5

| | GRF Contracts | Special GRF Contracts |
|---|---|---|
| Notional Value (NV) | Based on $100,000 (USD) or €100,000 (EUR) Notional Value (NV) at origination | |
| Quote | Quoted as interest rate (R) in minimum increments of one-quarter (¼) basis point or 0.01%. E.g., 3.7675%, 3.7700%, 3.7725%, etc. | Quoted as interest rate differential (R) between general and special collateral rates, in minimum increments of one-quarter (¼) basis point or 0.01%. E.g., 1.2375%, 1.2400%, 1.2425%, etc. |
| Final Settlement Value (FSV) | Interest due on End Date calculated as function of days until maturity (d) and transacted interest rate (R) as: $$Interest = (\$/€)100,000 \times (d/360) \times R$$ E.g., if R = 3.765% and d = 7 days then Interest = ($/€)100,000 × (7/360) × 0.03765 = ($/€)73.21. | Interest differential due on End Date calculated as function of days until maturity (d) and transacted interest rate differential (R) as: $$Interest\ Differential = (\$/€)100,000 \times (d/360) \times R$$ E.g., if R = 1.2400% and d = 14 days then Interest Differential = ($/€)100,000 × (14/360) × 0.012400 = ($/€)48.22. |
| Cash Flows | Longs pay Notional Value (NV) of ($/€)100,000 in cash. Cash passed from account of long to account of short. Shorts secure borrowing by posting General Collateral equal in value to NV with CME Clearing House. Collateral is returned to short while $100,000 plus interest is passed from short to long on End Date. | Longs surrender a specified security (Special Collateral) equivalent to Notional Value (NV) of ($/€)100,000. Special Collateral passed from account of long to account of short. Shorts secure borrowing by posting General Collateral equal in value to the Special Collateral plus a risk premium with CME Clearing House. General Collateral is returned to short while Special Collateral plus interest differential is passed to long on End Date. |
| Collateral | CLF Contracts may be secured by the short (borrower) with securities designated as good General Collateral by CME Clearing House. A "haircut" may be applied to some items as designated by CME Clearing House. | Special CLF Contracts require the long (lender) to surrender a specified security designated by its unique CUSIP number which security is passed to the account of the short (borrower). The short (borrower) secures the contract with securities designated as good General Collateral by CME Clearing House. A "haircut" may be applied to some collateral items as designated by CME Clearing House. |
| End Dates | Overnight, 1-week, 2-weeks, 3-weeks, 1-month, 2-months, 3-months, 6-months from current date | |
| Trading Hours | Privately transacted between counterparties and novated by mutual consent to CME Clearing House; or, traded on CME Globex® electronic trading platform Sundays thru Thursdays from 5:00 pm–4:00 pm (CT) the following day. Daily shutdown 4:00 pm–5:00 pm. | |

COLLATERALIZED LENDING USING A CENTRAL COUNTERPARTY

BACKGROUND

Repo transactions require borrowers to sell securities (loan collateral) to lenders for cash today, with the understanding that the transaction is reversed on a specified end date. Repo transactions are often conducted on an overnight basis. "Term repo" transactions are held for a specific term, e.g., 1-week, 2-weeks, 1 month, etc. Borrowers are said to enter a repo transaction or "repoed out" the securities; lenders conduct "reverse repo" transactions. Repo trades are often collateralized by U.S. Treasury securities but may be secured by other mutually agreed collateral. Usually the collateral is wired vs. cash to the lender but is sometimes held per a 3rd party custody arrangement. At least $5 trillion (USD) is repoed annually in the U.S. with perhaps another € 6.4 trillion (EUR) in Europe. Repo transactions are bilateral transactions between two parties which requires an assumption of credit risk by one party with respect to the other. The reliance on the acceptance of counterparty credit risks makes repo transactions vulnerable when credit is scarce. Under such economic conditions, mechanisms which mitigate risk and provide security may be needed to facilitate and encourage lending transactions.

BRIEF DESCRIPTION OF THE DRAWINGS

FIG. 3 shows a table of exemplary GRF terms according to one embodiment.

FIG. 5 shows exemplary terms for SRF contracts as compared with GRF contracts.

DETAILED DESCRIPTION

Figure 1:
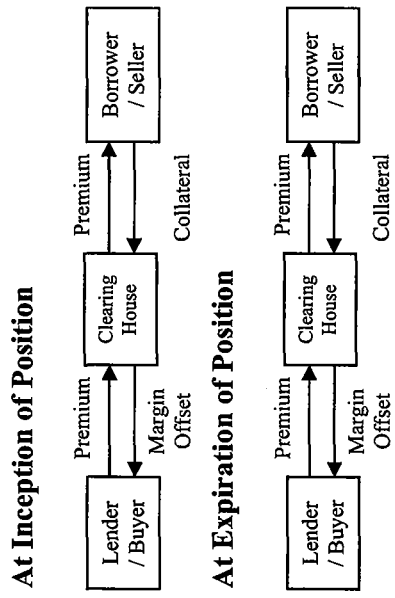
FIG. 1 shows a schematic representation of box spread transaction.

The disclosed embodiments relate to a collateralized lending system and method using a central counterparty. A lending entity/lender may place orders to enter into long contracts with an intermediary, i.e. a central counterparty, obligating them to lend an asset, or portion thereof, such as cash or a particular security. Borrowing entities/borrowers may place orders to enter into short contracts with the intermediary obligating them to borrow an asset or a substantial equivalent thereof, such as cash or a particular security. The intermediary may then match and settle appropriate orders. The net effect acts like a lending transaction between the lending entity and the borrowing entity but with the risk of default by the borrowing entity undertaken by the intermediary rather than the lending entity. The contracts, referred to below as a "General Repo Futures" ("GRF") and "Special Repo Futures" ("SRF"), may be characterized at least by the value, type or amount of an asset to be lent/borrowed, the interest rate, the delivery/settlement date, i.e. when the loan begins, the term of the loan, or combinations thereof. The asset may be cash or one or more particular securities, such as Treasury securities. The intermediary anonymously matches counter-orders from one or more borrowing entities and one or more lending entities and facilitates, at the settlement/delivery date, the lending transaction by novating itself into the matched transaction between the borrowing entity(s) and the lending entity(s), i.e. the lending entity(s) tenders the asset, or portion thereof, to the intermediary, such as to a clearing entity operated by the intermediary, and the intermediary/clearing entity loans/delivers the asset, or portion thereof, or a substantial equivalent, to the borrowing entity(s). In one embodiment, the intermediary/clearing entity may collect collateral from the borrowing entity(s) in exchange for the loan, the amount required varying based on the value of the loan and/or the nature of the collateral. The intermediary may then administer the loan upon delivery until it expires. Upon expiration of the loan, the intermediary/clearing entity facilitates redemption of the loan, e.g. repayment by the borrowing entity(s) to the central counterparty, and return of the collateral, and repayment by the central counterparty to the lending entity(s), as well as collection and payment of interest, fees, etc. As a result of the novation, the transactions between the central counterparty and the lending entity(s) and borrowing entity(s) are independent and guaranteed. Thereby, the ability to borrow is simplified and the risk of loss due to borrower default and/or management of the collateral is absorbed by the central counterparty, encouraging borrowing activity by prospective borrowers and lending activity by prospective lenders, resulting in increased credit availability. Other features of the disclosed embodiments will be described below.

In contrast to GRF's, which will be described in more detail below, market participants, given the myriad of expirations and strike listings available from which to choose in an options market, can often utilize index option products to engineer very interesting financial solutions. One possibility is to use Index Option Box Spreads to simulate collateralized lending and borrowing.

An option box spread consists of four individual option positions, or "legs." Using the CME Group European-style End-of-Month (EOM) options on S&P 500 futures as an example, one can consider the following combination, with all options expiring at the end of September 2008:

| Long | Short |
| --- | --- |
| Call Struck at 500 | Put Struck at 500 |
| Put Struck at 2500 | Call Struck at 2500 |

As can be seen, if the present time is early August 2008, the two long options positions are "deep in the money," whereas the two short positions are deep out of the money. "Deep in the money" refers to a call option whose exercise (strike) price is considerably below the underlying security's current market price, i.e. that the option would be exercised at the expiration with high probability. With regards to a put option, "deep in the money" indicates that the exercise price is well above the underlying security's current market price. More interestingly, regardless of the price of the underlying futures at the expiration of these options, this combination will always generate a payout of 2,000 index points, or $500,000, i.e. with the two European-style options struck at 500, the owner of the options combination will acquire a futures position at the price of 500 at the expiration. Likewise, with the two options struck at 2,500, the owner of the combination will dispose of a futures positions at the price of 2,500. The two opposing futures positions will net 2,000 index points, regardless of the price of the underlying futures at that point. As such, the box spread behaves like a discount instrument, with the premium priced at the net present value of the 2,000-point payoff. Effectively, the trade is equivalent to lending out $500,000 for the period corresponding to the remaining life of the options contracts.

A close inspection of the credit relationship suggests that this trade is roughly equivalent to a term "repo" transaction in the money market, in which a third party is acting as the custodian of the collateral. Repo transactions, as described above, require borrowers to sell securities (loan collateral) to lenders for cash today, with the understanding that the transaction is reversed on a specified end date. Repo transactions are often conducted on an overnight basis. "Term repo" transactions are held for a specific term, e.g., 1-week, 2-weeks, 1 month, etc. Borrowers are said to enter a repo transaction or "repoed out" the securities; lenders conduct "reverse repo" transactions. Repo trades are often collateralized by U.S. Treasury securities but may be secured by other mutually agreed collateral. Usually the collateral is wired vs. cash to the lender but is sometimes held per a 3rd party custody arrangement. At least $5 trillion (USD) is repoed annually in the U.S. with perhaps another €6.4 trillion (EUR) in Europe.

The buyer of the options combo pays the premium in cash, and will receive the fixed payout at the expiration. Effectively, the buyer lends the money for the balance of the option's life. The seller of the options combo takes in cash premium, and will repay the fixed payout at the expiration. Effectively, the seller borrows the money. The differential between the repayment and the upfront options premium is the interest payment.

The clearing house of the exchange, such as the Chicago Mercantile Exchange ("CME"), performs a very important function in this trade. From the perspective of the buyer or lender, it guarantees the performance of the borrower/seller. CME Clearing demanding and holding a suitable amount of collateral from the seller or borrower makes this guarantee possible.

Since the repayment is a fixed amount and is not subject to market risk, the collateral requirement for the borrower will amount to the value of the loan. Strictly speaking, the precise level of collateral requirement will change slightly given normal changes in the options mark-to-market prices. Since the combination is nothing more than a fixed rate loan, the mark-to-market value of the options combination will not fluctuate significantly in relation to the principal. The borrower can post liquid securities at CME Clearing, subject to the "haircut schedule" in effect. As such, the borrower will slightly over-collateralize the loan. This is very similar to a repo transaction, in which the borrower transfers securities to the lender at a slightly over-collateralized level to ensure performance.

In an options box trade, however, the collateral will reside at CME Clearing instead of being passed to the lender. It is as if the lender has a claim on the clearing house. This claim can be used for margin offset purposes for the lenders' other options and futures positions at CME Clearing. Schematically, the credit relationship resembles the arrangement shown in FIG. 1.

Box spreads enjoy several advantages over the traditional term repo:

Net Margin Requirement: From the borrower's perspective, the performance bond requirement is a single number that encompasses the requirements for all positions held at CME Clearing. A margin surplus in the rest of the portfolio can be applied to the collateralized borrowing using box spreads. Conversely, the lender will enjoy the margin offset afforded by the long box spreads position to fulfill performance bond requirements for the rest of his/her positions in futures and options;

Substitution of Collateral: The borrower may desire to substitute collateral underlying a repo transaction. If it were an unintermediated repo, the lender would have to be involved in the substitution—wiring out the old collateral and receiving the new collateral, and so on. In the case of these box spreads, the lender is literally facing CME Clearing, leaving the duty of interfacing with the borrower to the clearing house. Therefore, when the borrower decides to substitute collateral, the lender will not be involved; and Clean Close-Out Trades: Novation of these option boxes to CME Clearing allows for clean close-out trades. If either the lender or borrower wishes to close out the collateralized lending or borrowing early, they only need to sell or buy back the options boxes in the market. The novation process will net the existing positions with the closing trade. Of course, the close-out trade will be done at the current market rates. To the extent the box spreads behave like any other discount instruments, principal losses are possible. Again, the original counterparty would not be involved.

Borrowers and lenders may enjoy net margin benefits as well as counterparty efficiency working with CME Clearing in this arrangement.

As index option box spreads are no more complicated than discount instruments, pricing the net premium of the spreads is straightforward. Assuming that it is desirable to express the implicit interest rate using the ACT/360-day count convention, the following equation must be satisfied:

$$P \times (1 + r \bullet (\#days/36000)) = StrikeDiff$$

where P denotes the options premium, expressed in index points, r denotes the implicit interest rate, StrikeDiff denotes the difference between the two strike prices in the box spread, and #days denotes the remaining life of the options.

On any given day, and for any particular box spread combination, only P and r are unknown in the equation above. Thus, the equation provides a mapping from P to r, and vice versa. For example, with the two strikes 2,000 index points apart, and with 90 days left to expiration, a premium of 1990.25 would imply a rate of 1.96 percent per annum.

As with any discount instrument, an increase in price is equivalent to a drop in the interest rate. In listed options trading, the prices need to conform to the minimum price variation convention. For example, S&P 500 options trade in increments of 0.05 index points. Strictly speaking, the premium of an S&P Option ticks in 0.05 only if the premium is below five index points. However, there are two deep out-of-the-money options in each of the box spread, making the net premium eligible for 0.05 increments. This minimum price variation will also dictate the minimum price fluctuation in the equivalent rate quotes.

An approximate relationship between the minimum variation in premium and the corresponding rate difference is as follows:

$$\text{Change in Rate} \approx -(\text{Change in Premium}/\text{StrikeDiff}) \times (36000/\#days)$$

A more exact relationship can be shown to be:

$$\partial r \approx -(1 - r \bullet \text{frac})^2 \times (\partial P / \text{StrikeDiff}) \times (1/\text{frac})$$

where frac denotes the day count fraction. At a low interest rate environment, and for a short maturity, the leading term on the right is approximately 1.

Given a strike differential of 2,000 index points, and the options expiring in 90 days, each 0.05 increase in the premium is equivalent to a 0.01 percent, or 1 basis point, decrease in rates (per annum). Two observations can be made regarding this equation:

- large difference between the two strike prices will have two effects: (i) making the notional value per box larger, and (ii) forcing the minimum allowable variation in rates smaller, i.e., the boxes can be quoted in tighter increments in rate term; and
- As the expiration of the options draw closer, the minimum variation in terms of the implicit rate will become bigger, since the minimum variation in premium remains at 0.05.

As such, boxes are typically attempted with a large strike differential.

Since box spreads are nothing more than regular option trades, the cash flow timing conforms to regular trade processing schedule as well. Following the daily settlement of the trades, CME Clearing will issue the net cash variation pay and collect totals to the clearing firm, including the cash options premium. The cash variation shall be paid or received by the firm on the next business day on behalf of its customer.

Likewise, at the expiration of the options, CME Clearing will perform the necessary options exercise and assignment, followed by the mark-to-market settlement of the resulting futures positions. The net cash variation will then be relayed to the clearing firms, and will be paid on the following business day.

Assuming that the clearing firms make available the cash paid and deduct the cash used on the same day they make and receive payment on behalf of the customers, the cash movement would behave as if they were on a T+1 basis, both on the inception as well as on the maturity. This cash flow timing departs from the usual practice in the repo market, in which the cash flow occurs on the T+0 basis. Market participants may want to take the cash flow convention into consideration when pricing the trade.

It is worth noting that this trade should only be attempted with European-style options, i.e., options that cannot be exercised prior to the expiration. If attempted with American-style options, the full face value of the loan can be called back by exercising the options early (or, for that matter, immediately after the trade).

Within the family of options available at CME Group on the S&P 500 Index product, the End-of-Month (EOM) series of options are European-style options and are regularly listed with expirations out to six calendar months.

Beyond the regularly listed EOM options, European-style Flex options on S&P 500 Index futures, or any other regular-sized index futures, are also available. Since Flex options can be specified to expire on any given day, tailor-made financing solutions can be engineered.

Unfortunately, box spreads may not be the optimal implementation of a repo-type transaction having lower counterparty risk. In particular, box spreads are quoted in terms of the net option premium paid or received by buying or selling the components of the box option spread respectively. While an interest rate may be imputed, quoting based on interest rates would more accurately reflect the nature of the transaction and provide more utility. Further, the nature of the underlying transactions of the box spread limits precision over which the parties can control the interest rate. In addition, a box spread entails four separate transactions increasing the complexity and costs and fees which are typically charged on a per-transaction basis at the time of the transaction. The term of the delivered loan implemented by a box spread is also limited to terms offered by willing counterparties and, as such, requires a party to go hunting for a willing counterparty to the trade. Terms applicable to options are not necessarily as convenient as terms desired by borrowers. Further, box spreads may only implement a repo-type transaction for the lending/borrowing of cash, effectively undertaken at the time the options are purchased, but are incapable of conveying a particular piece of collateral, such as a Treasury note or bond, agency security, mortgage backed security ("MBS") or an equity, or establishing a forward type arrangement wherein the settlement/delivery of the loan occurs a date subsequent to the transaction date.

In contrast to utilizing box spreads of equity index options, the disclosed embodiments relate to an General Collateralized Lending Facility ("General CLF") contract and Special Collateralized Lending Facility ("Special CLF") contract, also referred to as "General Repo Futures" ("GRF") contract and "Special Repo Futures" ("SRF") contracts, representing a transparent, secured, market-driven lending facility. Similar to Option Box Spreads, they leverage the collateral management facilities of an exchange clearing house ("CH"), such as the CME CH, and provide an alternative to traditional repurchase agreement (repo) lending markets.

Figure 2:
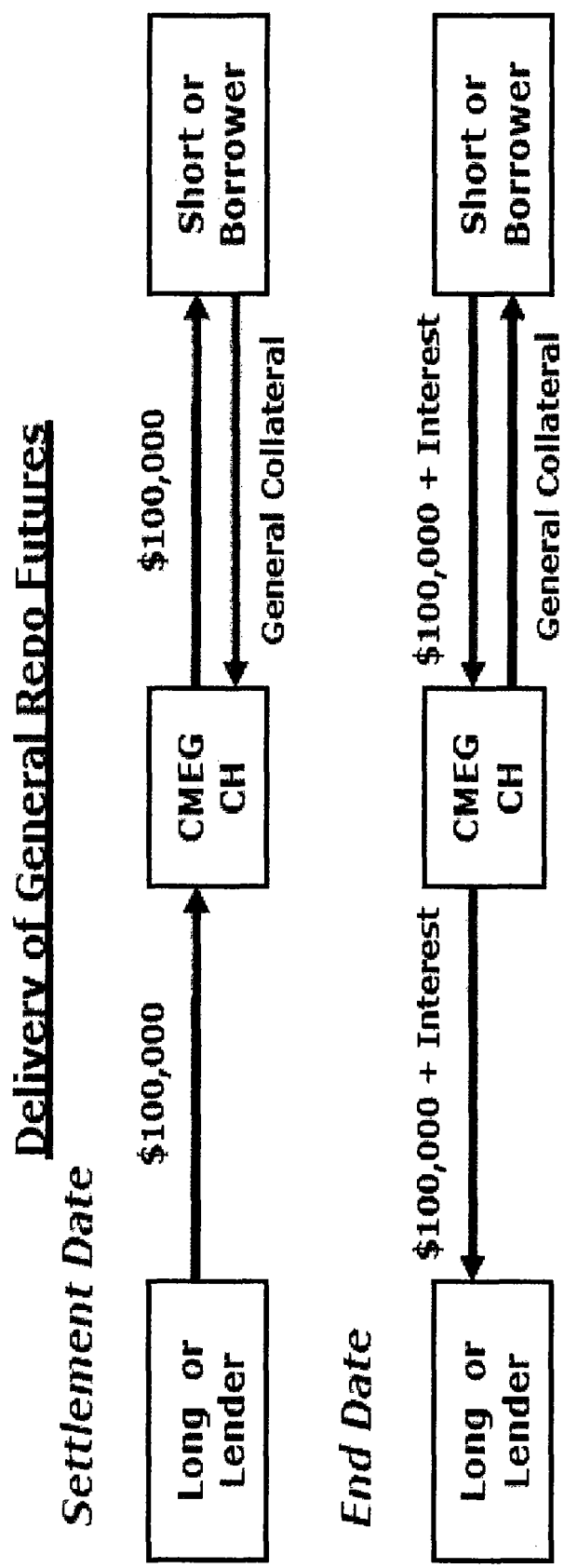
FIG. 2 shows a block diagram depicting exemplary operation of the disclosed embodiments with respect to GRF contracts.

GRF's may provide an alternative lending facility to repo transactions, denominated, for example, in either US dollars ($ or USD) or Euros (€ or EUR). In one embodiment, as shown in FIG. 2, a GRF contract calls for the delivery of a 3rd party custodian repurchase (repo) agreement upon delivery, administered by the CH, which leverages the CH's collateral management capabilities, providing a secure alternative to traditional repo markets. GRF contracts may be based upon an invariable notional value (NV) upon origination of, for example, ($/€)100,000 or such other fixed amount as may be determined by the Exchange. Upon purchase, longs (lenders) pay ($/€)100,000 or tender another asset, or portion thereof, as will described. This cash/asset, or a substantial equivalent thereof, is passed through the CH to the account of shorts (borrowers). Shorts may be required to post collateral equivalent in value to loaned value, such as the ($/€)100,000, in a form specified by the CH, as opposed to the lending party, such as Treasuries and other forms of collateral, sometimes subject to a haircut, which are considered good or general collateral. Cash and collateral may then be returned and interest may be paid from short to long on a specified end date. Thus, the delivery of a GRF contract may resemble a tri-party repo agreement but without the 3rd party custody arrangements which characterizes such an agreement. In summary, GRF contracts allow participants to lock-in short-term loan rates, enjoying the financial surety of the CH instead of accepting counterparty credit risks. FIG. 3 shows a table of exemplary GRF terms.

Figure 4:
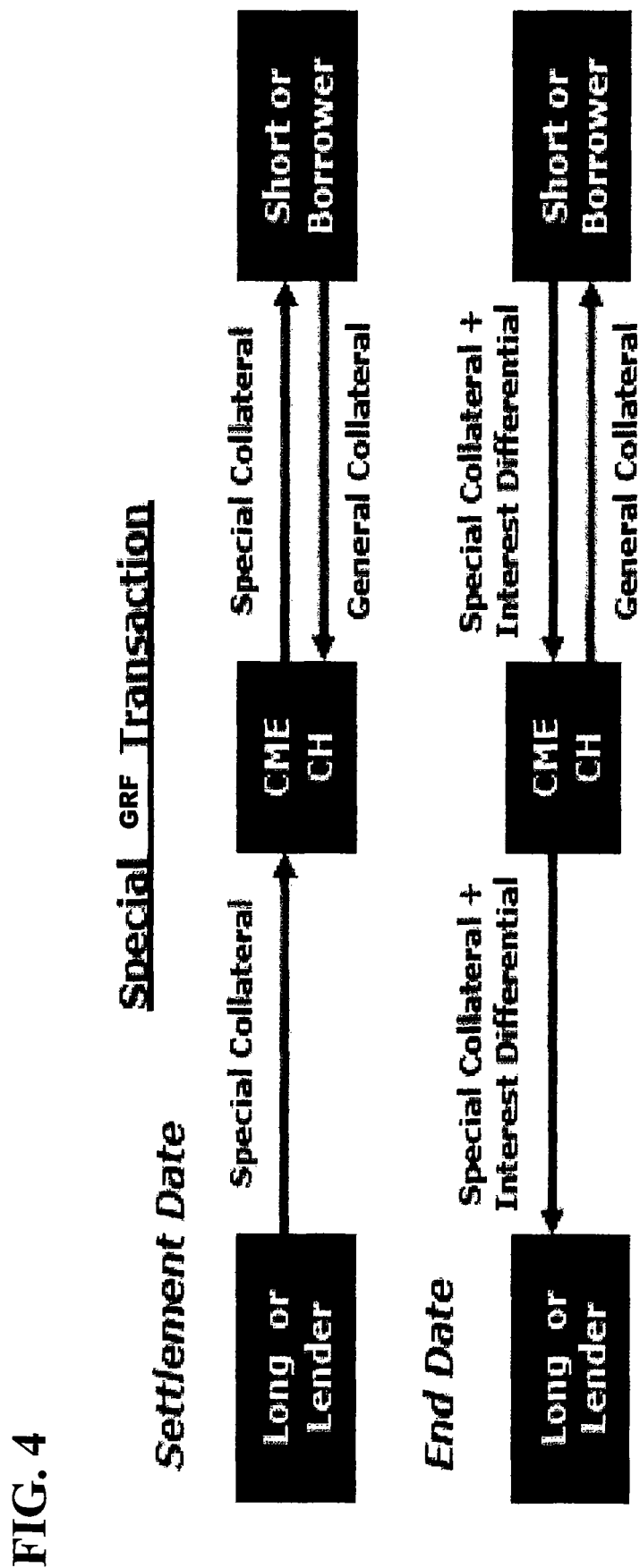
FIG. 4 shows a block diagram depicting exemplary operation of the disclosed embodiments with respect to SRF contracts.

In some situations, certain securities, including Treasury securities or stocks, are in short supply in the cash markets. Thus, in one embodiment, lenders may accept below market rates to lend that security on a short-term basis. These securities are said to go "on special." As shown in FIG. 4, a contract for the lending of a particular security, also referred to as a Special Collateralized Lending Facility ("Special CLF") contract or Special Repo Futures ("SRF") contract, may require a specified or special piece of collateral to be passed from long to short with the provision that such specified or special collateral is subsequently returned. Because shorts are interested in securing particular securities, cash is not transferred upon initial transaction. Short positions may be secured with general collateral equal in value to the special collateral plus a CH-specified risk premium. Special GRF contracts may be quoted as an interest rate differential on special vs. general collateral. FIG. 5 shows exemplary terms for SRF contracts as compared with GRF contracts.

Figure 6:
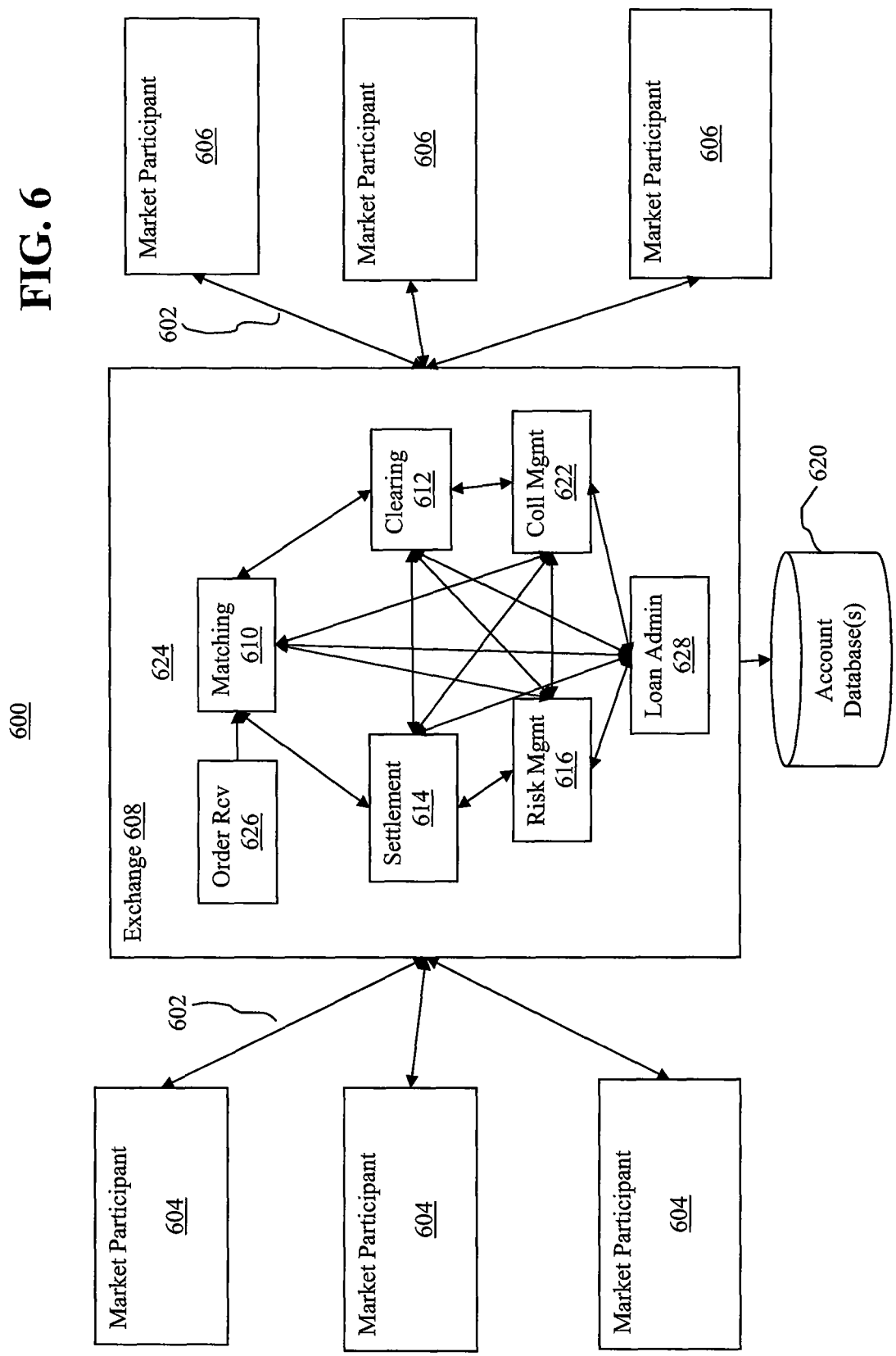
FIG. 6 shows a block diagram of a system 600 according to one embodiment.

Referring now to FIG. 6, there is shown a block diagram of an exemplary network 600 for trading GRF contracts, including SRF contracts, according to the disclosed embodiments. The network 600 couples market participants 604, 606, such as those entities 604 wishing to lend, also referred to as lending entities, lenders, longs or sellers, and those entities 606 wishing to borrow, also referred to as borrowing entities, borrowers, shorts or buyers, with an exchange 608, such as the CME, also referred to as a central counterparty or intermediary, via a communications network 602, such as the Internet, an intranet or other public or private, secured or unsecured communications network or combinations thereof. The network 600 may also be part of, or alternatively coupled with a larger trading network, allowing market participants 604 606 to trade other products, such as futures contracts, options contracts, foreign exchange instruments, etc., via the exchange 608. It will be appreciated that the plurality of entities utilizing the disclosed embodiments, e.g. the market participants 604, 606, may be referred to as lenders, borrowers, traders, market makers or by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant 604 606 and/or the exchange 608.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange 608 provides a system 624 which implements the functions of matching 610 buy/sell or lending/borrowing transactions, clearing 612 those transactions, settling 614 those transactions and managing risk 616 among the market participants 604 606 and between the market participants and the exchange 108, as well as administration functionality 628 for administering loans between delivery and redemption as will be described. In an alternate embodiment, collateral management 622 and/or request-for-quote functionality (not shown) or netting functionality (not shown) may also be provided, as is discussed in more detail below. The exchange 608 may be include or be coupled with one or more database(s) 620 or other record keeping system which stores data related to open, i.e. unmatched, orders, matched orders which have not yet been delivered, orders, i.e. loans, which have been delivered but not yet redeemed, collateral tendered to secure outstanding loans, or combinations thereof.

Typically, the exchange 608 provides a "clearing house" (not shown) which is a division of the Exchange 608 through which all trades made must be confirmed, matched and settled each day until offset or delivered. The clearing house is an adjunct to the Exchange 608 responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House. The disclosed embodiments, place trades in GRF contracts into the same "risk pool" as other products traded on the exchange, accordingly customers of the clearing members can enjoy the benefit of segregated treatment of assets at the clearing house (apart from clearing firm assets). The latter is significant since it shields end customers from exposure to their clearing firm's credit risk.

In the presently disclosed embodiments, the Exchange 608 assumes an additional role as the central counterparty in GRF or SRF transactions, i.e., the Exchange 608 will become the borrower to each lender and lender to each borrower, and assume responsibility for protecting borrowers and lenders from financial loss by assuring performance on each contract, as is done in futures transactions. Additionally, the Exchange 608 further assumes the role as administrator of the loan between delivery and redemption and facilitator of redemption upon expiration of the loan, as will be described. In an alternative embodiment, the Exchange 608 also assumes the roles as manager of the collateral provided by the borrower to secure the loan. As used herein, the term "Exchange" 608 will refer to the centralized clearing and settlement mechanisms, risk management systems, etc., as described below, used for futures trading, including the described enhancements to facilitate GRF or SRF transactions. By assuming this intermediary role and employing credit screening and risk management mechanisms, parties previously unwilling to lend and/or borrow, due, for example, to credit risks, may now trade anonymously with mitigated risk.

While the disclosed embodiments will be described in reference to the CME, it will be appreciated that these embodiments are applicable to any Exchange 608, including those which trade in equities and other securities. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

As an intermediary, the Exchange 608 bears a certain amount of risk in each transaction that takes place. To that end, risk management mechanisms protect the Exchange via the Clearing House. The Clearing House establishes clearing level performance bonds (margins) for all CME products and establishes minimum performance bond requirements for customers of CME products. A performance bond, also referred to as a margin, is the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance. As will be discussed below, additional functionality, in particular, collateral management functionality 622, is provided by the disclosed embodiments to provide risk management for GRF transactions.

The accounts of individual members, clearing firms and non-member customers doing business through CME must be carried and guaranteed to the Clearing House by a clearing member. As mentioned above, in every matched transaction executed through the Exchange's facilities, the Clearing House is substituted as the buyer to the seller and the seller to the buyer, with a clearing member assuming the opposite side of each transaction. In the disclosed embodiments, in every matched GRF or SRF transaction executed through the Exchange's facilities, the Clearing House is substituted as the lender to the borrower and the borrower to the lender, with a clearing member assuming the opposite side of each transaction. The Clearing House is an operating division of the Exchange 608, and all rights, obligations and/or liabilities of the Clearing House are rights, obligations and/or liabilities of CME. Clearing members assume full financial and performance responsibility for all transactions executed through them and all positions they carry. The Clearing House, dealing exclusively with clearing members, holds each clearing member accountable for every position it carries regardless of whether the position is being carried for the account of an individual member, for the account of a non-member customer, or for the clearing member's own account. Conversely, as the contra-side to every position, the Clearing House is held accountable to the clearing members for the net settlement from all transactions on which it has been substituted as provided in the Rules. As will be explained below, these mechanisms will be augmented so as to handle GRF or SRF transactions.

More information about minimizing the risk to the Exchange 608 while similarly minimizing the burden on members, approximating the requisite performance bond or margin requirement as closely as possible to the actual positions of the account at any given time and improving the accuracy and flexibility of the mechanisms which estimate performance bond requirements, may be found in the following U.S. Patent Applications, all of which are incorporated by reference herein, which disclose functionality which may be further used in combination with the disclosed embodiments:

U.S. patent application Ser. No. 11/030,815, "SYSTEM AND METHOD FOR ACTIVITY BASED MARGINING", filed Jan. 7, 2005, now U.S. Pat. No. 7,769,815;

U.S. patent application Ser. No. 11/030,796, "SYSTEM AND METHOD FOR EFFICIENTLY USING COLLATERAL FOR RISK OFFSET", filed Jan. 7, 2005, now U.S. Pat. No. 7,426,487;

U.S. patent application Ser. No. 11/030,833, "SYSTEM AND METHOD FOR ASYMMETRIC OFFSETS IN A RISK MANAGEMENT SYSTEM", filed Jan. 7, 2005, now U.S. Pat. No. 7,509,275;

U.S. patent application Ser. No. 11/030,814, "SYSTEM AND METHOD FOR DISPLAYING A COMBINED TRADING AND RISK MANAGEMENT GUI DISPLAY", filed Jan. 7, 2005;

U.S. patent application Ser. No. 11/031,182, "SYSTEM AND METHOD FOR FLEXIBLE SPREAD PARTICIPATION", filed Jan. 7, 2005, now U.S. Pat. No. 7,593,877;

U.S. patent application Ser. No. 11/030,869, "SYSTEM AND METHOD FOR HYBRID SPREADING FOR RISK MANAGEMENT", filed Jan. 7, 2005, now U.S. Pat. No. 7,428,508;

U.S. patent application Ser. No. 11/030,849, "SYSTEM AND METHOD OF MARGINING FIXED PAYOFF PRODUCTS", filed Jan. 7, 2005, now U.S. Pat. No. 7,430,539;

U.S. patent application Ser. No. 11/590,540, filed Oct. 31, 2007, entitled SYSTEM AND METHOD FOR CENTRALIZED CLEARING OF OVER THE COUNTER FOREIGN EXCHANGE INSTRUMENTS;

U.S. patent application Ser. No. 11/452,653, filed Jun. 14, 2006, entitled SYSTEM AND METHOD FOR DIRECTED REQUEST FOR QUOTE;

U.S. patent application Ser. No. 11/452, 673, filed Jun. 14, 2006, entitled HYBRID CROSS MARGINING, now U.S. Pat. No. 7,801,810;

U.S. patent application Ser. No. 11/601,489, filed Nov. 17, 2006, entitled DETECTION OF INTRA-FIRM MATCHING AND RESPONSE THERETO;

U.S. patent application Ser. No. 11/600,984, filed Nov. 17, 2006, entitled MULTIPLE QUOTE RISK MANAGEMENT, now U.S. Pat. No. 7,734,538; and U.S. patent application Ser. No. 11/600,993, filed Nov. 17, 2006, entitled CROSS-CURRENCY IMPLIED SPREADS, now U.S. Pat. No. 7,809,631.

As discussed above, by acting as an intermediary between market participants 604/606 for the transaction of GRF or SRF instruments, the Exchange 608 obviates many of the requirements of a bilateral system of lending. In particular, the Exchange 608 novates itself into the transactions between the market participants, i.e. splits a given transaction between the parties into two separate transactions where the Exchange 608 substitutes itself as the counterparty to each of the parties for that part of the transaction, sometimes referred to as a novation. In this way, the Exchange 608 acts as a guarantor and central counterparty and there is no need for the market participants 604/606 to disclose their identities or subject themselves to credit checks or other investigations by a potential counterparty. Further, there is no need for a lender to collect collateral from a borrower to secure a loan as the Exchange 608, as will be described, guarantees the loan to the lender, utilizing its own risk management mechanisms to secure the loan between the Exchange 608 and the borrower, thereby allowing the borrower more flexibility with respect to the collateral provided. For example, the Exchange 608 insulates one market participant 604/606 from the default by another market participant 604/606. Market participants 604/606 need only meet the requirements of the Exchange 608. Anonymity among the market participants 604/606 encourages a more liquid market environment as there are lower barriers to participation while centralized performance guarantees and collateral management increase the availability of credit.

In addition, by acting as an intermediary, the Exchange 608 is able to provide additional functionality that may not be available in bilateral lending situations. In one embodiment, the Exchange 608 provides collateral management functionality allowing a borrower to provide various types of collateral, subject to haircuts as will be discussed, substitute collateral during the term of a loan, utilizing excess margin to satisfy collateral requirements, or combinations thereof.

In one embodiment, the system 624 provided by the Exchange 608 for implementing GRF or SRF transactions includes order receiving functionality 626, matching functionality 610 coupled with the order receiving functionality 626, as well as settlement 614, clearing 612, risk management 616 functionality and an account database 620 coupled therewith. Further loan administration 628 and collateral management 622 functionality coupled with the risk management functionality 616 may also be provided.

It will be appreciated that the functionality of the Exchange 608, including the order receiving 626, matching 610, clearing 612, settlement 614 and risk management 616 functionality, as well as the loan administration 628 and collateral management 622 functionality, may be implemented in hardware, software or a combination thereof. In one embodiment, the disclosed functionality is implemented entirely in hardware. In particular, the exchange 608 may provide an order receiving processor 626, matching processor 610, clearing processor 612, settlement processor 614, risk processor 616, loan administration processor 628 and/or collateral management processor 622 to implement the disclosed functionality. Further, this functionality may be implemented in logic or computer program code stored in a memory and executable by one or more specialized or general purpose processors which may be directly or indirectly connected, such as via a network. The disclosed account database 620 may include one or more databases or other record keeping systems implemented on one or more storage devices or memories, such as magnetic, optical or electrical based storage devices or memories which are configured to store data representative of transactions processed by the exchange 608, including cash or other assets tendered or otherwise delivered, physically or electronically, to the exchange 608 by the lenders, cash or other assets delivered, physically or electronically, by the exchange 608 to the borrowers, cash or other assets returned, physically or electronically, by the exchange 608 to the lenders, collateral delivered, physically or electronically, to the exchange 608 by the borrowers, collateral returned, physically or electronically, by the exchange 608 to the borrowers, changes in value of collateral held by the exchange 608, fees/interest charges or combinations thereof.

The disclosed embodiments, which, as described, may be implemented in a computer, facilitate, by an intermediary, the lending of an asset. In one embodiment, the intermediary is an Exchange 608, such as the CME. The asset may be cash, one or more securities or other assets or combinations thereof. In one embodiment, the asset is a particular security such as a fixed income or equity security. Depending upon the implementation and/or the type of asset, the asset borrowed may be a substantial equivalent of the asset which is lent. For example, a borrower may not receive that actual cash provided to the Exchange 608 by the lender but, instead, receives a substantial equivalent thereof, i.e. cash of equal value. It will be appreciated that other substitutions of assets, or portions thereof, may be utilized, whereby substantial equivalence, e.g. the transactional goal of the transacting entities, is met, and, as such, is implementation dependent. It will be appreciated that asset equivalence may be defined by the Exchange 608, market participants 604, 606, governmental or regulatory authority, or combinations thereof. Further, in cases where a single borrower wishes to borrow more than a single lender is willing to lend, the borrower's transaction may be matched, as will be described, with more than one lending transaction, thereby a given lender may only lend a portion of the asset being borrowed. In an alternate embodiment, the Exchange 608 may permit a single lending transaction to match against multiple borrowing transactions, thereby the borrower only borrowing a portion of the asset being lent. Various combinations of transactions may be further supported.

In one embodiment, the system 624 includes one or more processors, such as processors 610, 612, 614, 616, 622, 626, 628, and may further include one or more network interfaces (not shown) and one more memory and/or storage devices/media (not shown), herein referred to as memory, coupled with the processor(s). The processor(s) may include any general or special purpose computer processor as is known and may be operative, such as via first logic, e.g. computer program logic, stored in the memory and executable by the processor(s), to receive, such as via the network interface(s), from a first entity of a plurality of entities, a first request or order for a first loan transaction relating to a loan of the asset for a specified duration. In one embodiment, the first entity may be different from the intermediary. The first transaction may be a borrowing or lending transaction. The first request may include a request or order to trade a long GRF or SRF contract or otherwise lend an asset or a portion thereof, or the first request may include a request or order to trade a short GRF or SRF contract or otherwise borrow an asset or a portion thereof. It will be appreciated that a request to lend or otherwise trade in a long GRF or SRF contract may be considered or treated like a sell transaction as the first entity may deliver the asset, or portion thereof, to be lent to the exchange 608 in return for a claim against the exchange 608 plus interest, etc., to be paid back at the end of the loan. Similarly, a request to borrow or otherwise trade in a short GRF or SRF contract may be considered or treated like a buy transaction. The first request may specify the parameters of the GRF or SRF contract which the first entity desires to trade, such as an amount or specification of an asset to be lent, interest rate or other fees, delivery date, i.e. when will the asset be delivered and the loan term commence, the duration, or expiration date, of the loan, or combinations thereof. One or more of these parameters may be standardized, i.e. the first entity specifies the type of contract they wish to trade selected from a predefined set of available contract types, defined, for example, by the exchange 608. Exemplary parameters of available contract types are shown in FIGS. 3 and 5. Other parameters may be defined and are implementation dependent. Further, one or more of the parameters may be variable or otherwise configurable by the first entity, constrained to certain values or ranges or unconstrained, such as the quantity of the asset, the interest rate, or other parameters or combinations thereof. In one embodiment, GRF or SRF contracts are tradeable in $100,000 increments.

In particular, the specification of a delivery date permits the forward trading of GRF or SRF contracts, e.g. the delivery can be specified for a date subsequent to the date on which the transaction request is submitted to the exchange 608 and/or matched by the exchange 608 as will be described. This permits transacting entities to transact in "forward" loans. As used herein, the "trade date" refers to the date on which an order or request to transact is submitted to the exchange 608 and/or matched with a counter order/request by the matching functionality 610 of the exchange 608. The settlement or delivery date is the date on which asset, or portion thereof, to be lent is tendered by the lending entity to the exchange 608 and on which the asset, or portion thereof, or the substantial equivalent thereof is delivered by the exchange 608 to the borrowing entity. In one embodiment, the settlement or delivery date may exclusively refer to the delivery to the borrower independent of the tender by the lender as the delivery to the borrower may be guaranteed independent of the performance by the lender. The settlement or delivery date is also the date on which the loan commences. The loan then runs for a specified term or duration. The redemption date is the date on which the duration or term expires and the loan is to be paid back to the exchange 608 and ultimately to the lender. Accordingly, the settlement/delivery date can occur subsequent to the trade date, such as zero to seven days after.

The processor(s) may be further operative, such as via second logic stored in the memory(s), coupled with the first logic, and executable by the processor(s), to identify a second request or order received by the Exchange 608 from a second entity of the plurality of entities for a second loan transaction at least partially counter to the first loan transaction and to match, such as via third logic stored in the memory, coupled with the second logic and executable by the processor, the first request with the second request, the second entity being different from the intermediary. Requests or orders to lend are matched with requests or orders to borrow, etc.

In particular, the request for a first transaction is matched with a request for a second transaction that was previously received but, itself, not matched with another request at the time of receipt. Unmatched requests are placed in a queue or other data structure, referred to sometimes as an "order book," which may be maintained in the database 620. An unmatched request, also referred to as an open order, is said to be "resting" in the order book. Matching is the process of locating another request/order at least partially counter to the present order. For example, if the request for a first transaction is to borrow a particular asset for particular terms, a counter transaction would a request to lend the particular asset, or a portion thereof, for the same, or substantially equivalent terms. It will be appreciated that the rules governing what constitutes a transaction and counter transaction, i.e. what constitutes a match, may be implementation dependent and may be defined by the exchange 608, market participants 604, 606 and/or governmental or regulatory organizations, or combinations thereof. If the exchange 608 is unable to match the first request with a suitable second request, the first request is added to the order book to await a subsequent suitable transaction request at least partially counter thereto. At any given moment, there may be multiple orders/transaction requests resting in the order book, some of which may be similar, varying for example, by interest rate, term, delivery, or other parameter values, or combinations thereof. Further, transacting entities may withdraw their transaction requests prior to matching and/or submit new requests with different parameters. It is the presence of competing transactions requests and the ability to withdraw and submit new requests which facilitates creation of a market.

The processor(s) may be further operative, such as via fourth logic stored in the memory(s), coupled with the third logic and executable by the processor(s), to facilitate, based on the match, the first and second loan transactions, without identifying the first and second entities to each other, to effect a delivery of at least a portion the asset or a substantial equivalent thereof from one of the first and second entities to the other of the first and second entities, i.e. from the lender to the borrower via the intermediary. As was described, the processor(s) may be further operative to novate the first and second transactions, i.e. substitute the intermediary, e.g. the Exchange 608, for the second entity in the first loan transaction and substitute the intermediary, e.g. the Exchange 608, for the first entity in the second loan transaction. Accordingly, the processor(s) may be operative, such as via further execution the fourth logic, to perform the first loan transaction between the first entity and the intermediary and perform the second loan transaction between the second entity and the intermediary, whereby the performance of the first loan transaction is independent of the performance of the second loan transaction. In this way, the transactions are anonymized with respect to the first and second entities and performance of each transaction is guaranteed by the intermediary.

Further, as was described, where the entities are transacting for a forward transaction, the processor(s) may be further operative to facilitate the first and second loan transactions at a date subsequent to the occurrence of the matching. In this case, the matched transactions are maintained in a database 620, coupled with the exchange 608, to be executed on the delivery date as described above. In one embodiment, the delivery of the at least a portion of the asset may include one of a transfer of the at least a portion of the asset or a provision of a substantial equivalent thereof between one, e.g. the lending entity, of the first and second entities and the other, e.g. the borrowing entity, of the first and second entities, the transfer taking place between the lending entity and the Exchange and between the Exchange and the borrowing entity.

In one embodiment, one of the first and second entities may transact with a third entity between when the processor(s) matches the first and second requests and when the processor(s) facilitates the first and second loan transactions to substitute the third entity for the one of the first and second entities. This may permit an entity to sell or otherwise trade its position to another entity. Similarly, entities may be permitted to transact with third parties subsequent to delivery but prior to redemption.

The processor(s) may be further operative, such as via fifth logic stored in the memory(s), coupled with the fourth logic and executable by the processor(s), to facilitate redemption of the at least a portion of the asset or substantial equivalent thereof upon expiration of the duration, e.g. at the end of the loan. In particular, the processor(s) may be operative, such as via further execution of the fifth logic, to perform a third transaction substantially counter to the first loan transaction between the first entity and the intermediary and a fourth transaction substantially counter to the second loan transaction between the second entity and the intermediary, whereby the performance of the third transaction is independent of the performance of the fourth transaction. Effectively, the intermediary, e.g. the Exchange 608 reverses the first and second transactions to collect on the loan from the borrowing entity and repay the lending entity. In one embodiment, one of the third and fourth transactions may include collection of a fee, such as interest, a transaction fee, or combination thereof, in addition to the at least a portion of the asset from one of the first and second entities, and the other of the third and fourth transactions may comprise payment of the fee to the other of the first and second entities. Transaction fees charged by the exchange 608 may be deducted from the collected fees prior to payment to the lending entity. The fee may be computed based at least on the specified duration, as well as other factors, such as the amount of the loan, the delay between matching and delivery, etc.

As can be seen, the intermediary, e.g. the exchange 608, must not only administer the requisite transactions between the trade and delivery dates, as is done with typical futures contracts, but must further administer the loan during the term and facilitate redemption thereof, a function not required of an exchange 608 when transacting in typical futures contracts, administration of which typically ends at delivery. In particular the exchange 608 may include loan administration functionality 628, implemented as a loan administration processor 628 or computer program logic stored in the memory and executable by one or more processors, which administers the loans subsequent to delivery. In one embodiment, the loan administration functionality 628 may be implemented by the processor(s) described above wherein the processor(s) may be further operative, such as via additional logic stored in the memory and executable by the processor(s), to, subsequent to the delivery of the at least a portion the asset or the substantial equivalent thereof from the one of the first and second entities to the other of the first and second entities, maintain a record of the first and second transactions at least until the expiration of the duration. Records of the transactions may be mainrespect to GRF or SRF contracts, the exchange 608 mitigates loss by requiring borrowing entities to provide collateral to the exchange 608 to secure their loan. The collateral is returned at the time the loan expires and the borrower redeems the loan, i.e. pays it back. Exemplary acceptable collateral is shown in Table 1 below.

Physical delivery into an expiring GRF or SRF contract results in the creation of what is essentially a tri-party collateralized loan agreement, with 3rd party custody arrangements administered by the exchange 608. In one embodiment, any collateral that the exchange currently accepts to secure performance bonds may also be accepted as collateral, and referred to as "contract grade."

TABLE 1

Exemplary Acceptable Collateral and Applicable Haircut

| Cash | |
|---|---|
| US Dollar | No haircut |
| Australian dollar, British pound, Canadian dollar, Euro, New Zealand dollar, Norwegian krone, Swedish krona, Swiss franc | 3% |
| Japanese yen | 5% |
| Mexican peso | 15% |
| Selected Sovereign debt of Canada, France, Germany, Sweden, United Kingdom | |
| Discount bills | 3% |
| 0-5 years | 5.5% |
| 5-10 years | 7% |
| 10-30 years | 8.5% |
| >30 years | |
| US Treasuries | |
| US Treasury bills | No haircut |
| US Treasury bonds & notes 0-5 years | 2% |
| US Treasury bonds & notes 5-10 years | 3.5% |
| US Treasury bonds & notes 10-30 years | 5% |
| If security is off-the-run | 0.5% added |
| US Treasury strips (principal & coupon) | 10% |
| US Government Agencies - Limited to combination of letters of credit and government agencies of no more than 50% of clearing member's core performance bond requirement in excess of $5 million. This restriction does not apply to the clearing firm's reserve performance bond or concentration requirements. | |
| Discount notes (with remaining maturity of no more than 12 months) issued by Federal Farm Credit Banks, Federal Home Loan Bank System, Federal Home Loan Mortgage Corp. and Federal National Mortgage Assoc. | 3% with 0.5% added if security is off the run |
| Callable and Non-callable Fannie Mae Benchmark Bills; Callable and Non-callable Freddie Mac Reference Bills; Callable and Non-callable Federal Home Loan Bank Bills; Callable and Non-callable Federal Farm Credit Bank Bills | 3% with 0.5% added if security is off the run |
| Callable and Non-callable Fannie Mae Benchmark Notes and Bonds; Callable and Non-callable Freddie Mac Reference Notes and Bonds; Callable and Non-callable Federal Home Loan Bank Notes and Bonds; Callable and Non-callable Federal Farm Credit Bank Notes and Bonds | 0-5 years: 3%<br>5-10 years: 4.5%<br>10+ years: 6%<br>0.5% if off the run |
| Select Mortgage Backed Securities (MBS) | 10% | tained in a database 620 coupled with the exchange 608 and utilized to track the loan and facilitate redemption at the expiration thereof. As there may be multiple loans having varying delivery dates, interest rates, redemption dates, etc. at any given time, the database 620 may facilitate tracking and redemption of loans as they are delivered and as they expire.

As was described above, the exchange 608, via the clearing house, employs risk management functionality so as to mitigate risk of loss in the transactions to which it is a party through novation. For example, traders are required to post performance bonds to meet margin requirements to cover potential losses in their portfolios. In one embodiment, with The above Haircut Schedule is exemplary only and representative of applicable haircut values as of Dec. 19, 2008. It will be appreciated that haircut values are regularly subject to change at the discretion of the clearing house, including, but not limited to, adjustments to haircut levels and acceptable collateral.

Acceptable collateral may comprise exempt securities, such as Treasuries, as well as cash (denominated either in U.S. dollars or in foreign currencies, foreign sovereign debt, securities issued by U.S. government sponsored enterprises, and various asset backed securities, all subject to haircuts described herein. As further means of managing risk exposure, the exchange 608 may subject this collateral to a daily mark-to-market process. Importantly, contract grade collateral may exclude use of particular securities or instruments as may be specified by the Exchange, e.g., IEF programs, Letters of Credit (LCs), or equity securities.

Note that, in standard repo markets, different interest rates may be offered depending upon the type of collateral used to secure the loan. Thus, higher loan rates may be associated with agencies vs. Treasuries; or, with MBS over agencies. The exchange 608 of the disclosed embodiments utilizes an altogether different model by essentially homogenizing different types of collateral through the application of a haircut, i.e. an adjustment to the value accorded to the collateral in satisfaction of the collateral requirement. This may have the effect of coalescing loan activity behind a single collateral management system rather than fragmenting liquidity amongst repos collateralized with divergent types of collateral.

In particular, the exchange 608 may include collateral management functionality 622, as a part, or independent, of the risk management functionality 616, which evaluates loan transactions, sets collateral requirements, facilitates collection of collateral in satisfaction thereof and return of collateral at redemption. As collateral is managed centrally by the Exchange 608, lending parties need not worry about collecting or holding collateral or subsequently returning the collateral, or the substantial equivalent thereof, at the end of the loan, thereby significantly reducing related transaction costs to the lending entities. Further, risk of loss due to changes in the value of the collateral are avoided by the lending entity. In one embodiment, the collateral management functionality 622 may be implemented by the processor(s) described above wherein the processor(s) is further operative to, via additional logic stored in the memory(s) and executable by the processor(s) facilitate receipt of first collateral by the intermediary, e.g. the exchange 608 and/or clearing house associated therewith, from one of the first and second entities in exchange for the delivery of the at least a portion of the asset or the substantial equivalent thereof. Exemplary collateral is described above. The processor(s) may be further operative to facilitate the exchange's 608 holding of the collateral for the term of the loan and the return of the collateral upon redemption, such as by storing records relating to the collateral in a database coupled with the processor(s). In one embodiment, during the term of the loan, the borrowing entity may be permitted to substitute different collateral for collateral previously provided. In bilateral arrangements, such substitution would be difficult and involve significant transaction costs. In the disclosed embodiments, the processor(s) may further operative to facilitate receipt, by the intermediary from the one of the first and second entities, second collateral in exchange for the first collateral without notifying an other of the first and second entities. The intermediary, e.g. exchange 608, further insulates the lending entities from value fluctuations in the collateral provided by the borrower. In particular, if the value of the collateral should change during the term of the loan, e.g. diminish, the lender is insulated by the intermediary's guarantee of the transaction. Further, to protect itself from risk of loss, the intermediary may seek additional collateral to make up for the shortfall in value. The lending entity, thereby is not at risk should the borrower default, as the intermediary guarantees repayment to the lending entity, absorbing the risk of default and risk that the collateral may not cover the loss. In addition, the processor(s) may be further operative to homogenize different collateral types, as was described, by computing an amount of collateral required by the intermediary in exchange for the delivery, the first collateral being received in satisfaction thereof, evaluating a risk of the first collateral changing in value, adjusting the amount by which the first collateral satisfies the amount of collateral required based on the evaluation and applying the adjusted amount towards satisfaction of the amount of collateral required, and identifying the amount of collateral required which remains unsatisfied. In particular, the collateral management functionality may employ similar risk management techniques used to evaluate risk of loss in a portfolio, to evaluate risk of loss in a loan transaction based on the collateral provided. The disclosed embodiments may evaluate the quality of the collateral, e.g. the risk that the collateral may change, or has changed, in value and, in particular, lose, or has lost, value. That evaluation may then be used to apply a haircut to the value of the collateral, i.e. to adjust the amount of credit that will be given for the collateral towards satisfaction of the collateral requirement. Where the collateral is of low quality, e.g. high risk of loss, the value may be substantially discounted when applying it towards satisfaction of the collateral requirement, thereby requiring the borrower to provide additional collateral to make up for the deficiency. Thereby, the intermediary, e.g. the Exchange 608, mitigates risk of loss due to default while widening the types of collateral available for use. It will be appreciated that the collateral may be evaluated upon receipt, i.e. at delivery of the loan, as well as periodically thereafter, such as daily, weekly or monthly, and its value adjusted. Should the value diminish, such as during the term of the loan, the borrowing entity may be required to furnish additional collateral to make up for the shortfall, e.g. similar to a margin call. If the value should increase, the excess collateral may be returned to the borrower. The timing of the evaluations and adjustments, in addition to the response to diminished or increased collateral value, is implementation dependent.

Figure 7:
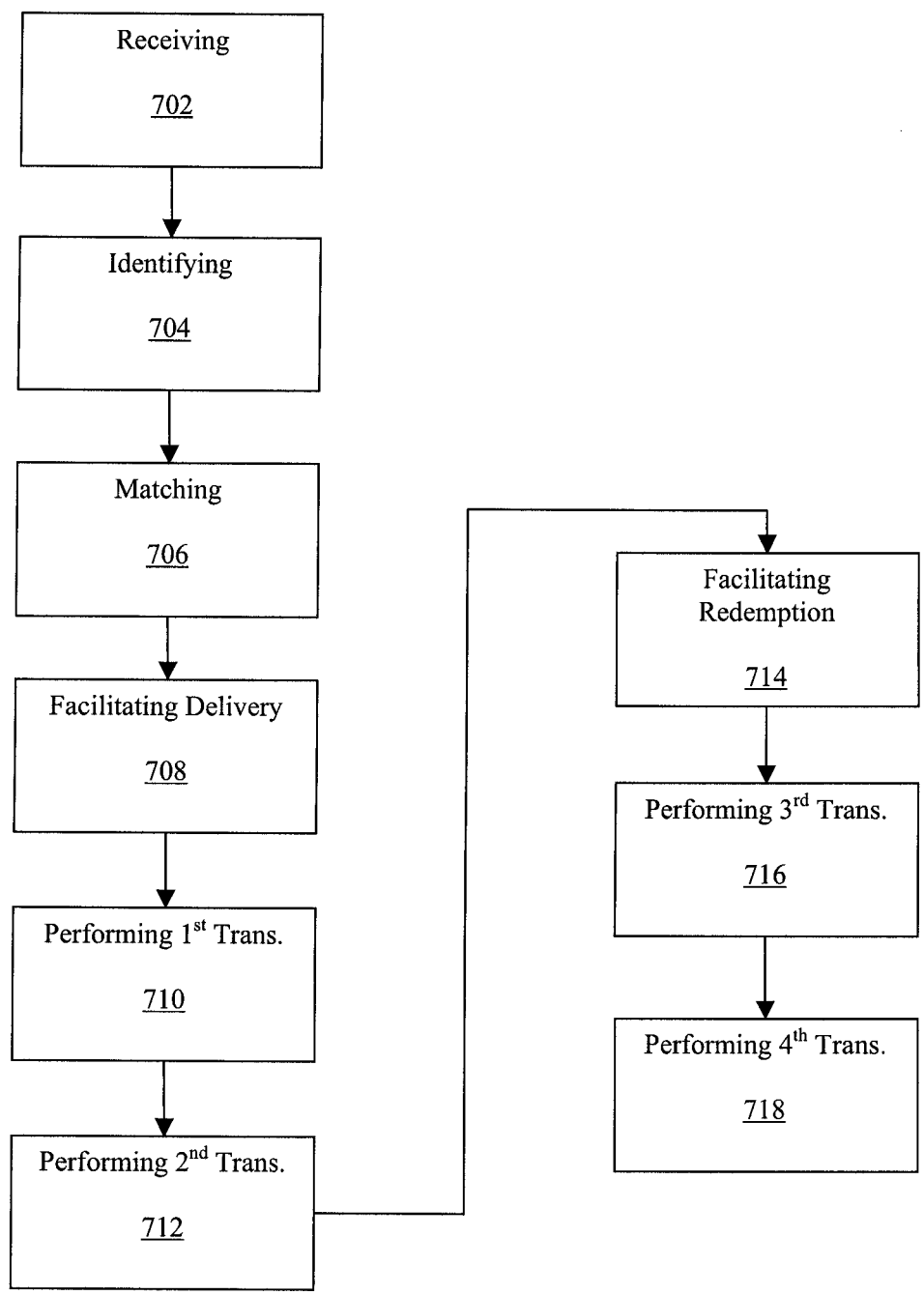
FIG. 7 shows a flow chart detailing exemplary operation of the exchange shown in FIG. 6.

FIG. 7 shows a flow chart detailing exemplary operation of the exchange 608 shown in FIG. 6. In one embodiment, the above described system implements a method of facilitating lending an asset. The method includes receiving, by a processor operated by an intermediary, from a first entity of a plurality of entities a first request for a first loan transaction relating to a loan of the asset for a specified duration, the first entity being different from the intermediary (Block 702). The asset may comprise one of cash or a security, or other asset or combination thereof. One of the first and second loan transactions may comprise a lending of at least a portion of the asset and the other of the first and second loan transactions may comprise a borrowing of at least a portion of the asset. The method further includes identifying, by the processor, a second request received by the processor from a second entity of the plurality of entities for a second loan transaction at least partially counter to the first loan transaction, the second entity being different from the intermediary (Block 704) and matching, by the processor, the first request with the second request (Block 706). As described, the matching involves a novation, i.e. the matching further comprises substituting the intermediary for the second entity in the first loan transaction and substituting the intermediary for the first entity in the second loan transaction.

The method further includes facilitating, by the processor based on the matching, the first and second loan transactions without identifying the first and second entities to each other to effect a delivery of at least a portion the asset or a substantial equivalent thereof from one of the first and second entities to the other of the first and second entities (Block 708), wherein the facilitating of the first and second loan transactions further comprises: performing the first loan transaction between the first entity and the intermediary (Block 710) and performing the second loan transaction between the second entity and the intermediary (712), whereby the performance of the first loan transaction is independent of the performance of the second loan transaction. The delivery of the at least a portion of the asset may comprise one of a transfer of the at least a portion of the asset or a provision of a substantial equivalent thereof between one of the first and second entities and the other of the first and second entities. Further, the facilitating of the first and second loan transactions may occur at a date subsequent to the occurrence of the matching.

The method further includes facilitating, by the processor, redemption of the at least a portion of the asset or substantial equivalent thereof upon expiration of the duration (Block 714), where the facilitating of the redemption includes performing a third transaction substantially counter to the first loan transaction between the first entity and the intermediary (Block 716) and performing a fourth transaction substantially counter to the second loan transaction between the second entity and the intermediary (Block 718), whereby the performance of the third transaction is independent of the performance of the fourth transaction. Subsequent to the delivery of the at least a portion the asset or the substantial equivalent thereof from the one of the first and second entities to the other of the first and second entities, the method may further include administering the loan such as by maintaining a record of the first and second transactions at least until the expiration of the duration. In addition, one of the third and fourth transactions comprises collecting a fee, such as interest and/or a transaction fee in addition to the at least a portion of the asset from one of the first and second entities and the other of the third and fourth transactions may comprise paying the fee to the other of the first and second entities. The fee may be computed based at least on the specified duration of the loan. In an alternate embodiment, one of the first and second entities may transact with a third entity between the matching and the facilitating of the first and second loan transactions to substitute the third entity for the one of the first and second entities.

The method may further include management of collateral such as wherein the facilitating of the first and second loan transactions further may comprise receiving first collateral by the intermediary from one of the first and second entities in exchange for the delivery of the at least a portion of the asset or the substantial equivalent thereof. The first collateral may comprise one of cash or a security or other asset or combination thereof. The first collateral may be held by the intermediary and at least a portion of the first collateral may be returned upon redemption of the asset or the substantial equivalent thereof. In an alternate embodiment, the method may further include receiving, by the intermediary from the one of the first and second entities, second collateral in exchange for the first collateral without notifying an other of the first and second entities. The value of the first collateral may vary, the independence of the third and fourth transactions being unaffected thereby. The method may further include computing an amount of collateral required by the intermediary in exchange for the delivery, the first collateral being received in satisfaction thereof, evaluating a risk of the first collateral changing in value, adjusting the amount by which the first collateral satisfies the amount of collateral required based on the evaluating and applying the adjusted amount towards satisfaction of the amount of collateral required, and identifying the amount of collateral required which remains unsatisfied. The evaluation and adjustment, which may be done at delivery and/or periodically thereafter, may be used to compensate for the quality of the collateral, e.g. the risk that the collateral may diminish, or has diminished, in value prior to redemption.

As has been described, the General Repo Futures (GRF) contract offers the following refinements relative to financing through an option box spread:

Quotation—GRFs may be quoted in terms of an interest rate rather than in terms of the net option premium paid or received by buying or selling the box option spread respectively. One may impute the interest rate associated with a box but a direct quotation in terms of an interest rate is more useful. The interest, according to the rate, may be paid at the end date of the GRF contract.

Precision—GRFs may be quoted in terms of an interest rate to the nearest one-half basis point (0.00005%) change in yield or such other interval as determined by the Exchange. This may be distinguished from an option box spread which is quoted (again) as the net premium associated with the four options associated with the trade. One will find that by changing the value of one of the four legs of the option box spread, that the resulting changing in the implicit yield may be much higher than one-half basis point. I.e., it is imprecise and does not allow the user to alter the implicit interest in fine increments.

Efficiency—An option box spread entails the trade of four (4) different options. One may "leg-into" each of those four legs individually. Or, one may attempt to find a market maker who will quote a unified price for all four legs of the option box spread. Either way, the trader is responsible for fees and charges associated with trading four separate contracts to accomplish one purpose. It is much more efficient to accomplish the same purpose, i.e., delivery of a secured loan through a GRF which entails one leg instead of four.

Term of Delivered Loan—GRFs may result in the delivery of a secured loan of varied terms depending upon how one elects to configure the contracts. I.e., an overnight (O/N) loan, 2-days, 3-days, 7-days, 14-days, etc., etc. The implicit term of an option box is the maturity date of the four options that constitute the trade. While CME offers "flex options" with terms that may be determined mutually by the two parties to the transaction, one must go hunting for a willing counterparty to the trade. GRFs may be offered or listed to result in the delivery of secured loans with terms that are believed will be most convenient for borrowers rather than terms that are most practicable for option traders.

Extension of Model—"General Repo Futures" (GRFs) convey a secured loan of cash upon delivery. However, "Special Repo Futures" (SRFs) may be offered as well. SRFs convey the loan of a particular piece of collateral upon delivery against the futures contract (i.e., a security such as a Treasury note or bond, agency security, MBS or possibly even an equity) which is borrowed and secured with some "general" collateral (i.e., any old security). (Note that particular securities that are in great demand often go "on special" in the repo markets and borrowers become sufficiently eager to hold such securities—possibly to make good on a short position against which they may have to deliver—that they will offer enticing terms to borrow those securities.) This cannot be accomplished with an option box spread which is limited to the lending/borrowing of cash not securities.

GRFs and SRFs are a futures contracts that call for the delivery of an instrument underlying a futures contract that is administered by the Exchange Clearing House throughout the life of the loan. Note that CME routinely administers the delivery of the underlying instruments associated with a futures contract. E.g., foreign currencies, grain, livestock, etc. However, for these instruments, the role of the Clearing House ceases upon delivery. GRFs differ because the Clearing House continues to administer the underlying instrument or loan from its initial delivery through to its eventual maturity.

It will be appreciated that other functionality may be provided such as request-for-quote functionality with permits a borrower to request non-binding quotes for particular lending transactions, such as a quote for an interest rate. Further lenders may be able to request non-binding quotes to determine demand for a loan, such as for a particular asset. In response to receiving a non-binding quote, the requestor may then choose to submit a binding trade request as described above. Further, netting of positions may be permitted, whereby a market participant, 604/606 may be permitted to net offsetting positions, such as outstanding lending and borrowing transactions, and/or other positions such as futures positions, so as to reduce margin and/or collateral requirements.

It is therefore intended that the foregoing detailed description be regarded as illustrative rather than limiting, and that it be understood that it is the following claims, including all equivalents, that are intended to define the spirit and scope of this invention.

We claim:

1. A computer implemented method of facilitating lending an asset, the method comprising:
    receiving, by a hardware processor operated by an intermediary, from a first entity of a plurality of entities a first request for a first loan transaction relating to a loan of the asset for a specified duration, the first entity being different from the intermediary, the first loan transaction including a long or a short Special Repo Futures (SRF) contract where a supply of the asset is below a supply threshold, wherein the SRF contract includes a quote including an interest rate differential between general and special collateral rates, in increments, and wherein the SRF contract includes a final settlement value including an interest differential due on an end date calculated as a function of time until maturity and a transacted interest rate differential, otherwise the first loan transaction including a long or a short General Repo Futures (GRF) contract, wherein the GRF contract includes a long position paying a notional value in cash and a short position securing borrowing by posting a general collateral equal in value to the notional value;
    identifying, by the hardware processor, a second request received by the hardware processor from a second entity of the plurality of entities for a second loan transaction at least partially counter to the first loan transaction, the second entity being different from the intermediary;
    matching, by the hardware processor, the first request with the second request;
    facilitating, by the hardware processor based on the matching, the first and second loan transactions without identifying the first and second entities to each other to effect a delivery of at least a portion the asset or a substantial equivalent thereof from one of the first and second entities to the other of the first and second entities, wherein the facilitating of the first and second loan transactions further comprises:
        performing the first loan transaction between the first entity and the intermediary and performing the second loan transaction between the second entity and the intermediary, whereby the performance of the first loan transaction is independent of the performance of the second loan transaction;
        receiving first collateral by the intermediary from one of the first and second entities in exchange for the delivery of the at least a portion of the asset or the substantial equivalent thereof;
        computing an amount of collateral required by the intermediary in exchange for the delivery, the first collateral being received in satisfaction thereof;
        evaluating, at a first time, a quality of the first collateral and a risk of the first collateral changing in value at a future time;
        calculating a haircut to a current value of the first collateral based on the evaluation of the quality of the first collateral and the risk of the first collateral changing in value at the future time;
        applying the haircut to the current value of the first collateral to determine a discounted collateral value of the first collateral that is discounted from the current value; and
        applying the discounted collateral value of the first collateral towards satisfaction of the amount of collateral required; and
    facilitating, by the hardware processor, redemption of the at least a portion of the asset or substantial equivalent thereof upon expiration of the duration, the facilitating of the redemption comprising:
    performing a third transaction substantially counter to the first loan transaction between the first entity and the intermediary and performing a fourth transaction substantially counter to the second loan transaction between the second entity and the intermediary, whereby the performance of the third transaction is independent of the performance of the fourth transaction.

2. The method of claim 1, wherein one of the first and second loan transactions comprises a lending of at least a portion of the asset and the other of the first and second loan transactions comprising a borrowing of at least a portion of the asset.

3. The method of claim 1, wherein the delivery of the at least a portion of the asset comprises one of a transfer of the at least a portion of the asset or a provision of a substantial equivalent thereof between one of the first and second entities and the other of the first and second entities.

4. The method of claim 1, wherein the first collateral comprises one of cash or a security.

5. The method of claim 1, wherein the first collateral is held by the intermediary.

6. The method of claim 1, wherein at least a portion of the first collateral is returned upon redemption of the asset or the substantial equivalent thereof.

7. The method of claim 1 further comprising receiving, by the intermediary from the first entity, second collateral in exchange for the first collateral without notifying the second entity.

8. The method of claim 1 wherein the value of the first collateral may vary, the independence of the third and fourth transactions being unaffected thereby.

9. The method of claim 1, further comprising: identifying the amount of collateral required which remains unsatisfied.

10. The method of claim 1, wherein the asset comprises one of cash or a security.

11. The method of claim 1, wherein one of the third and fourth transactions comprises collecting a fee in addition to the at least a portion of the asset from one of the first and second entities and the other of the third and fourth transactions comprises paying the fee to the other of the first and second entities.

12. The method of claim 11, wherein the fee is computed based at least on the specified duration.

13. The method of claim 1, wherein the matching further comprises substituting the intermediary for the second entity in the first loan transaction and substituting the intermediary for the first entity in the second loan transaction.

14. The method of claim 1, wherein the facilitating of the first and second loan transactions may occur at a date subsequent to the occurrence of the matching.

15. The method of claim 1, wherein one of the first and second entities may transact with a third entity between the matching and the facilitating of the first and second loan transactions to substitute the third entity for the one of the first and second entities.

16. The method of claim 1, further comprising:
subsequent to the delivery of the at least a portion the asset or the substantial equivalent thereof from the one of the first and second entities to the other of the first and second entities, maintaining a record of the first and second transactions at least until the expiration of the duration.

17. The method of claim 1, wherein the SRF contract includes a long position surrendering a special collateral equivalent to a notional value and a short position securing borrowing by posting a general collateral equal to in value to the special collateral plus a risk premium.

18. A system implemented in a computer for facilitating, by an intermediary, lending an asset, the system comprising:
a hardware processor operative to receive, from a first entity of a plurality of entities a first request for a first loan transaction relating to a loan of the asset for a specified duration, the first entity being different from the intermediary, the first loan transaction including a long or a short General Repo Futures (GRF) contract where a supply of the asset is above a supply threshold, wherein the GRF contract includes a long position paying a notional value in cash and a short position securing borrowing by posting a general collateral equal in value to the notional value, otherwise the first loan transaction including a long or a short Special Repo Futures (SRF) contract, wherein the SRF contract includes a quote including an interest rate differential between general and special collateral rates, in increments, and wherein the SRF contract includes a final settlement value including an interest differential due on an end date calculated as a function of time until maturity and a transacted interest rate differential; and
wherein the hardware processor is further operative to identify a second request received from a second entity of the plurality of entities for a second loan transaction at least partially counter to the first loan transaction and match the first request with the second request, the second entity being different from the intermediary; and
further wherein the hardware processor is operative to facilitate, based on the match, the first and second loan transactions without identifying the first and second entities to each other to effect a delivery of at least a portion the asset or a substantial equivalent thereof from one of the first and second entities to the other of the first and second entities, wherein the hardware processor is operative to perform the first loan transaction between the first entity and the intermediary and perform the second loan transaction between the second entity and the intermediary, whereby the performance of the first loan transaction is independent of the performance of the second loan transaction; and
further wherein the hardware processor is operative to facilitate redemption of the at least a portion of the asset or substantial equivalent thereof upon expiration of the duration, the hardware processor being operative to perform a third transaction substantially counter to the first loan transaction between the first entity and the intermediary and a fourth transaction substantially counter to the second loan transaction between the second entity and the intermediary, whereby the performance of the third transaction is independent of the performance of the fourth transaction
wherein the hardware processor is further operative to facilitate receipt of first collateral by the intermediary from one of the first and second entities in exchange for the delivery of the at least a portion of the asset or the substantial equivalent thereof;
wherein the hardware processor is further operative to compute an amount of collateral required by the intermediary in exchange for the delivery, the first collateral being received in satisfaction thereof;
wherein the hardware processor is further operative to evaluate, at a first time, a quality of the first collateral and a risk of the first collateral changing in value at a future time, calculate a haircut to a current value of the first collateral based on the evaluation of the quality of the first collateral and the risk of the first collateral changing in value at the future time, apply the haircut to the current value of the first collateral to determine a discounted collateral value of the first collateral that is discounted from the current value, apply the discounted collateral value of the first collateral towards satisfaction of the amount of collateral required, and identify the amount of collateral required which remains unsatisfied.

19. The system of claim 18, wherein one of the first and second loan transactions comprises a lending of at least a portion of the asset and the other of the first and second loan transactions comprising a borrowing of at least a portion of the asset.

20. The system of claim 18, wherein the delivery of the at least a portion of the asset comprises one of a transfer of the at least a portion of the asset or a provision of a substantial equivalent thereof between one of the first and second entities and the other of the first and second entities.

21. The system of claim 18, wherein the first collateral comprises one of cash or a security.

22. The system of claim 18, wherein the first collateral is held by the intermediary.

23. The system of claim 18, wherein at least a portion of the first collateral is returned upon redemption of the asset or the substantial equivalent thereof.

24. The system of claim 18 wherein the hardware processor is further operative to facilitate receipt, by the intermediary from the one of the first and second entities, second collateral in exchange for the first collateral without notifying an other of the first and second entities.

25. The system of claim 18, wherein the value of the first collateral may vary, the independence of the third and fourth transactions being unaffected thereby.

26. The system of claim 18, wherein the asset comprises one of cash or a security.

27. The system of claim 18, wherein one of the third and fourth transactions comprises collection of a fee in addition to the at least a portion of the asset from one of the first and second entities and the other of the third and fourth transactions comprises payment of the fee to the other of the first and second entities.

28. The system of claim 27, wherein the fee is computed based at least on the specified duration.

29. The system of claim 18, wherein the hardware processor is further operative to substitute the intermediary for the second entity in the first loan transaction and substitute the intermediary for the first entity in the second loan transaction.

30. The system of claim 18, wherein the hardware process is further operative to facilitate the first and second loan transactions at a date subsequent to the occurrence of the matching.

31. The system of claim 18, wherein one of the first and second entities may transact with a third entity between when the hardware processor matches the first and second requests and when the hardware processor facilitates the first and second loan transactions to substitute the third entity for the one of the first and second entities.

32. The system of claim 18, wherein the hardware processor is further operative to, subsequent to the delivery of the at least a portion the asset or the substantial equivalent thereof from the one of the first and second entities to the other of the first and second entities, maintain a record of the first and second transactions at least until the expiration of the duration.

33. The system of claim 18, wherein the GRF contract includes a quote including an interest rate, in increments, and wherein the GRF contract includes a final settlement value including an interest due on an end date calculated as a function of time until maturity and a transacted interest rate.

* * * * *